LEE S. TWOMEY
INVENTOR
ATTORNEY

Feb. 7, 1939.  L. S. TWOMEY  2,146,197
METHOD OF AND APPARATUS FOR SEPARATING MIXED GASES AND VAPORS
Filed March 14, 1936  4 Sheets-Sheet 3

LEE S. TWOMEY
INVENTOR

Paul W. Pritzman
ATTORNEY

Feb. 7, 1939.     L. S. TWOMEY     2,146,197
METHOD OF AND APPARATUS FOR SEPARATING MIXED GASES AND VAPORS
Filed March 14, 1936     4 Sheets-Sheet 4

LEE S. TWOMEY
INVENTOR

ATTORNEY

Patented Feb. 7, 1939

2,146,197

UNITED STATES PATENT OFFICE 2,146,197

METHOD OF AND APPARATUS FOR SEPARATING MIXED GASES AND VAPORS

Lee S. Twomey, Vista, Calif.

Application March 14, 1936, Serial No. 68,837

21 Claims. (Cl. 62—122)

The present invention pertains to the art of separating the individual constituents of a mixture of gases or vapors in a state of substantial or complete purity. In one aspect the invention comprises the separation of the gaseous or vaporous mixture into a plurality of liquid fractions and the further separation of one of these fractions into its constituents in a plurality of stages under diminishing pressure. In another aspect the invention comprises novel means for and method of transferring heat from one part of a fractionating system in which it may be in excess to another part in which it may be deficient, and for introducing controlled refrigerative effects into any step in a fractionating system from a source extraneous to the system.

The method and the apparatus used will first be described in connection with the fractionation of a ternary gas mixture such as atmospheric air, assuming that the air has previously been deprived of constituents of high freezing point (water and carbon dioxide) and neglecting the minor proportions of the rare gases.

In the attached drawings, which are used to illustrate various phases of the invention:

Figure 1:
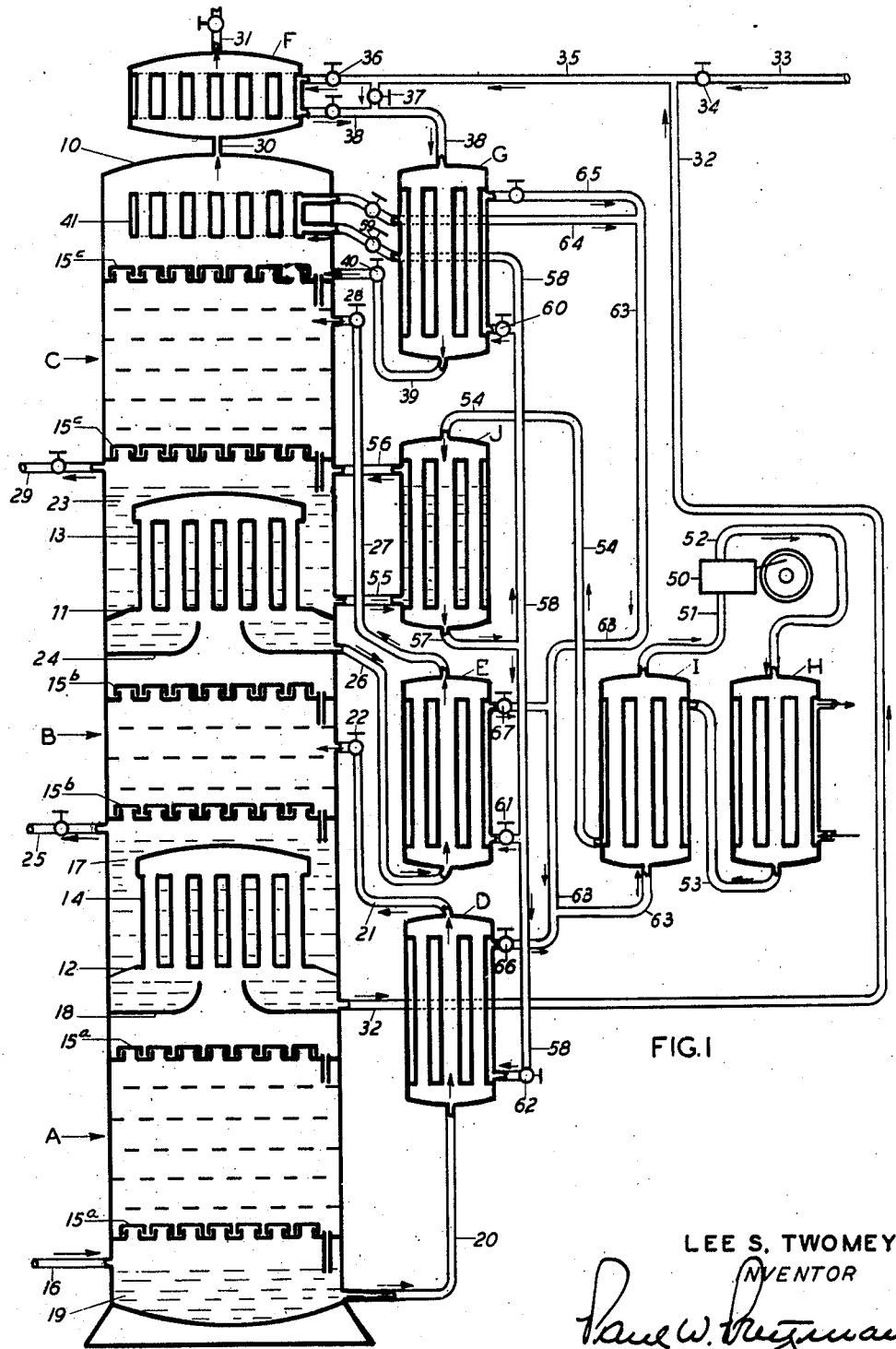
Fig. 1 is a vertical sectional diagram of a complete apparatus adapted to the fractionation of a ternary mixture of permanent gases, such as atmospheric air.

Referring first to Fig. 1, a fractionating tower 10 is divided into three compartments lettered A, B and C respectively, by means of partitions 11 and 12. These partitions include condensers 13 and 14, each of which projects into the compartment above and communicates only with the compartment below. Each compartment is provided with fractionating plates shown at 15a, 15b and 15c respectively. Ordinarily these will be bubble cap plates as shown for the top and bottom plates of each compartment.

Air compressed to 8 atmospheres absolute and assumed to be in the gaseous form and at the temperature (106° K.) of initial liquefaction at that pressure, is introduced into compartment A through inlet pipe 16. In this compartment the air is liquefied in transferring heat through condenser 14 to a bath 17 of pure oxygen boiling at 101° under 2.7 atmospheres pressure in the bottom of compartment B.

(All temperatures stated herein will be understood to be in degrees Kelvin, and all pressures in atmospheres absolute.)

The liquid produced by this condenser drains into a trough 18 in which it collects and from which a portion overflows to reflux the fractionating plates 15a below. The plates thus refluxed fractionate the vapor in the well known manner, the temperature at the bottom of the compartment being 106° while that at the top is 101°, the temperature of oxygen boiling under 2.7 atmospheres. By this fractionation pure liquid nitrogen is caused to collect in the trough while a so-called crude oxygen collects in pool 19 in the bottom of the column.

For each kilogram of air introduced to the column 0.400 kg. pure nitrogen may be withdrawn from the trough, as will be described, while the liquid collecting in pool 19 will contain the remainder of the original constituents, to-wit: 0.354 kg. nitrogen, 0.232 kg. oxygen and 0.014 kg. argon. These figures neglect the minute proportion of rare gases contained in the original air.

The crude oxygen passes through pipe 20 to an interchanger D in which it is cooled to 90° by evaporating liquid nitrogen in the transfer circuit which will be described. It then passes through pipe 21 to a control valve 22 by which it is admitted to compartment B, which is maintained at 2.7 atmospheres pressure. At 90° and 2.7 atmospheres the crude oxygen does not boil and thus the stream enters as a quiet feed, being introduced onto a plate on which the liquid has substantially the same temperature and composition.

As the feed flows downwardly over plates 15b, it becomes more highly heated and is partially vaporized, and as the bottom temperature of compartment B is 101° while the top temperature is 87°, the plates 15b function in the usual manner to separate the constituents. The vapors reaching the upper end of the compartment are liquefied by condenser 13 in transferring heat to a bath 23 of pure liquid argon boiling at 87° at atmospheric pressure in the bottom of compartment A. The liquid so condensed, a mixture of nitrogen and argon, drains into a trough 24 from which a portion of the liquid constantly overflows to reflux the plates below. Pure oxygen collects in pool 17 and is withdrawn as vapor through pipe 25 at such rate (0.232 kg. per kg. of air supply) as to maintain the pool at a constant level.

A quantity of the liquid collecting in trough 24 equal to 0.352 kg. nitrogen and 0.014 kg. argon per kg. of air supply passes through pipe 26 and an interchanger E in which it is cooled by evaporating liquid nitrogen in the transfer circuit to 77.4°+. The cooled liquid then passes through pipe 27 to a valve 28 by which it is admitted to a medial portion of compartment C, which is maintained at atmospheric pressure. At this temperature and pressure the nitrogen-argon mixture does not boil, but enters the compartment as a quiet liquid feed.

As the feed flows downwardly over plates 15c it becomes more highly heated and is partially vaporized, and as the bottom temperature of compartment A is 87° while the top temperature is 77.4°, the plates function in the usual manner to separate the constituents. Pure argon collects in pool 23 and is withdrawn as a vapor through pipe 29 at such rate (0.014 kg. per kg. of air supply) as to maintain the pool at a constant level. Pure nitrogen (in quantity equal to 0.754 kg. plus a small quantity of refrigerating nitrogen introduced in a later step) emerges from the top of the column through pipe 30 as a gas at 77.4° and atmospheric pressure. Under certain conditions this gas may be wet. Among these conditions are failure to sufficiently cool the nitrogen entering compartment C through valve 40, as will be described, also improperly designed or overloaded top plates in this compartment.

The gas leaving the top of the column is referred to as wet when it entrains a fine mist of liquid nitrogen, very difficult to remove mechanically. This entrainment does not reduce the purity of the gas but it does disturb the heat balance in the interchangers (not shown but later referred to) in which the air supply is reduced to the low temperature at which it is supplied to the column. To remove this mist the wet nitrogen is passed from pipe 30 through an interchanger F in which sufficient heat is imparted to it to evaporate the mist without appreciably changing the temperature of the gas, which finally leaves the apparatus through pipe 31. If the mist were allowed to pass into the main interchangers the cooling effect incident to its evaporation would be applied to the entering air and thus to the bottom of the column, where it is undesired. By interchanging this latent heat of evaporation against a nitrogen feed the refrigerative effect is returned to the top of the column, where it is desirable and useful.

Returning now to the bottom section of the column, the pure nitrogen collecting in trough 18 is continuously withdrawn in a quantity equal to the difference between the air supply and the crude oxygen produced, or 0.400 kg. nitrogen per kg. of air supply. This nitrogen, in liquid form at 101° and 8 atmospheres, passes through pipe 32 to a junction with pipe 33 by which a supply of liquid nitrogen sufficient to supply make-up refrigeration to the entire column is added, this nitrogen coming from any outside source at 112° and 16.2 atmospheres. Valve 34 controls this supply. The combined stream then passes through pipe 35 to a valve 36 which admits to interchanger F the amount of relatively warm nitrogen required to evaporate the entrained mist particles as above described. The remainder of the stream, above the quantity required for this purpose, is detoured through the by-pass valve 37.

The stream of nitrogen from pipe 35 and interchanger F then passes through pipe 38 to an interchanger G in which it is cooled to 77.4° by evaporating liquid nitrogen in the transfer circuit. At this temperature nitrogen does not boil on release to atmospheric pressure and the stream passing through pipe 39 and control valve 40 enters the upper end of compartment C as a quiet stream of pure nitrogen to act as reflux in this compartment.

Any desired additional supply of reflux liquid may be produced in the top of the column by means of reflux condenser 41 which is cooled by evaporating liquid nitrogen in the transfer circuit.

Now to describe the transfer circuit by means of which heat is transferred from one part of the column in which it may be in excess to another part in which heat may be required.

The transfer circuit is shown as a closed system, filled with pure nitrogen, but having no communication with the nitrogen in the column. A compressor 50 is supplied through pipe 51 with gaseous nitrogen at atmospheric temperature and pressure and delivers this gas stream at 3 atmospheres pressure through pipe 52 to a water-cooled interchanger H where the heat of compression is removed and the gas brought back to atmospheric temperature. The warm gas then passes through pipe 53 to an interchanger I where it is materially cooled and partially liquefied by heat interchange against cold returning nitrogen in the transfer circuit, as will be described. The cooled gas then passes through pipe 54 to an interchanger J where it is completely liquefied in boiling (at 87°) pure liquid argon which is withdrawn in the liquid form from pool 23 through pipe 55 and returns to the same compartment at a higher level through pipe 56.

It will be understood that the interchanger J in which the transfer fluid is condensed may be located in any stage of the column in which there is a condensate to be vaporized. The pressure to which the transfer fluid is compressed in the transfer circuit will be adjusted to produce condensation of the fluid at the temperature at which that particular condensate volatilizes.

The nitrogen so liquefied passes through pipe 57 to a distributing pipe 58 and thus to valve 59 which controls the cooling supply to reflux condenser 41, to valve 60 which controls the supply to interchanger G, to valve 61 which controls the supply to interchanger E, and to valve 62 which controls the supply to interchanger D. At each of these valves a suitable quantity of the liquid nitrogen is released to atmospheric pressure and boils at 77.4°, the supply to each interchanger being so controlled as to reduce the stream being cooled by heat interchange to only the desired temperature.

The nitrogen evaporated in each of these units returns to a collecting pipe 63 as follows: from reflux condenser 41 through pipe 64, from interchanger G through pipe 65, from interchanger D through pipe 66 and from interchanger E through pipes 67 and 68. The conjoined returning gas streams, which are at a variable low temperature, pass from pipe 63 into interchanger I where the gas is brought back to atmospheric temperature by heat interchange against water-cooled compressed nitrogen, thus providing the supply of atmospheric temperature and pressure nitrogen taken to the compressor through pipe 51 as above described.

It will be noted that the above description shows at various points a total lack of heat head, i. e., an equality of temperature on the two sides of a surface supposed to transfer heat. It will be understood in this connection that, in practice, the pressures by which these temperatures are regulated are so controlled as to provide the temperature differences necessary for heat transfer. These differences, which may be varied within limits according to the area of transfer surface provided in each instance, cannot be taken into consideration in the above description without assumptions which would be good only for one specific case.

While the transfer circuit is shown, for convenience, as a closed system, it will be understood that it would function in exactly the same manner if its nitrogen supply were drawn from a source outside the system and discharged to any other point after doing its described work of heat transfer within the fractionating system. Such arrangements would be fully equivalent to the closed transfer circuit described, the functioning of the circuit as a medium of heat transfer being entirely independent of the origin and the destination of the nitrogen within it.

Figure 4:
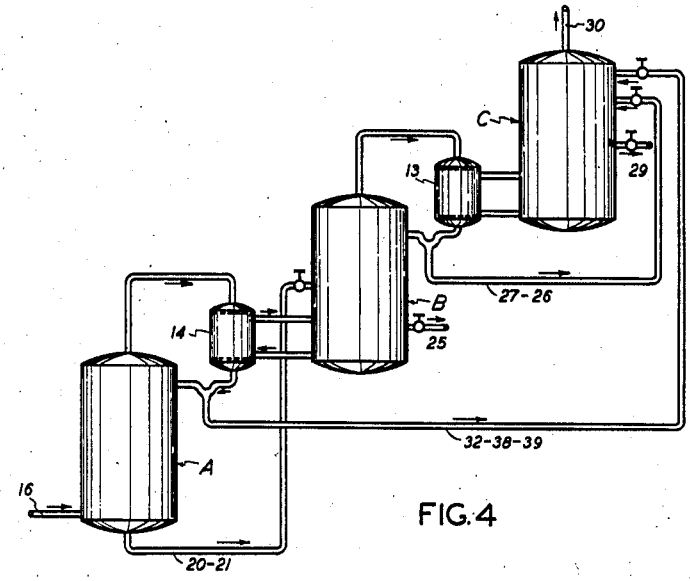
Figs. 4 and 5 are diagrams illustrating the possibility of arranging the compartments of Fig. 1 as independent shells without changing their functions.
Figure 5:
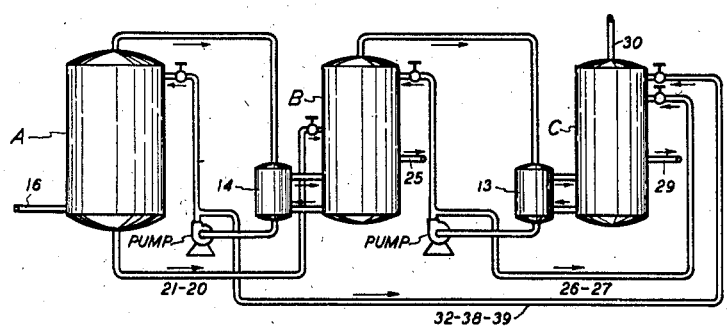

The superposition of the three compartments shown in Fig. 1 is a matter of convenience and structural economy, not of function. Figs. 4 and 5 show modifications of this structure which are functionally identical with that described, it being understood that in these diagrams only those portions of the assembly which are changed in relative arrangement are shown, the transfer circuit apparatus above described being omitted.

In both of these figures the three compartments A, B, and C are formed as independent shells and the intervening condensers 13 and 14 are also provided as separate units (side arms) placed between adjacent shells at such level that the condensate collecting in the bottoms of the compartments will partially fill them. In the form of Fig. 4 the relative levels are such that the reflux condensing in these condensers will gravitate back to the shell in which its vapors originate, while in the form of Fig. 5 the shells are placed at a common level and the reflux is returned by means of the pumps indicated.

Figure 2:
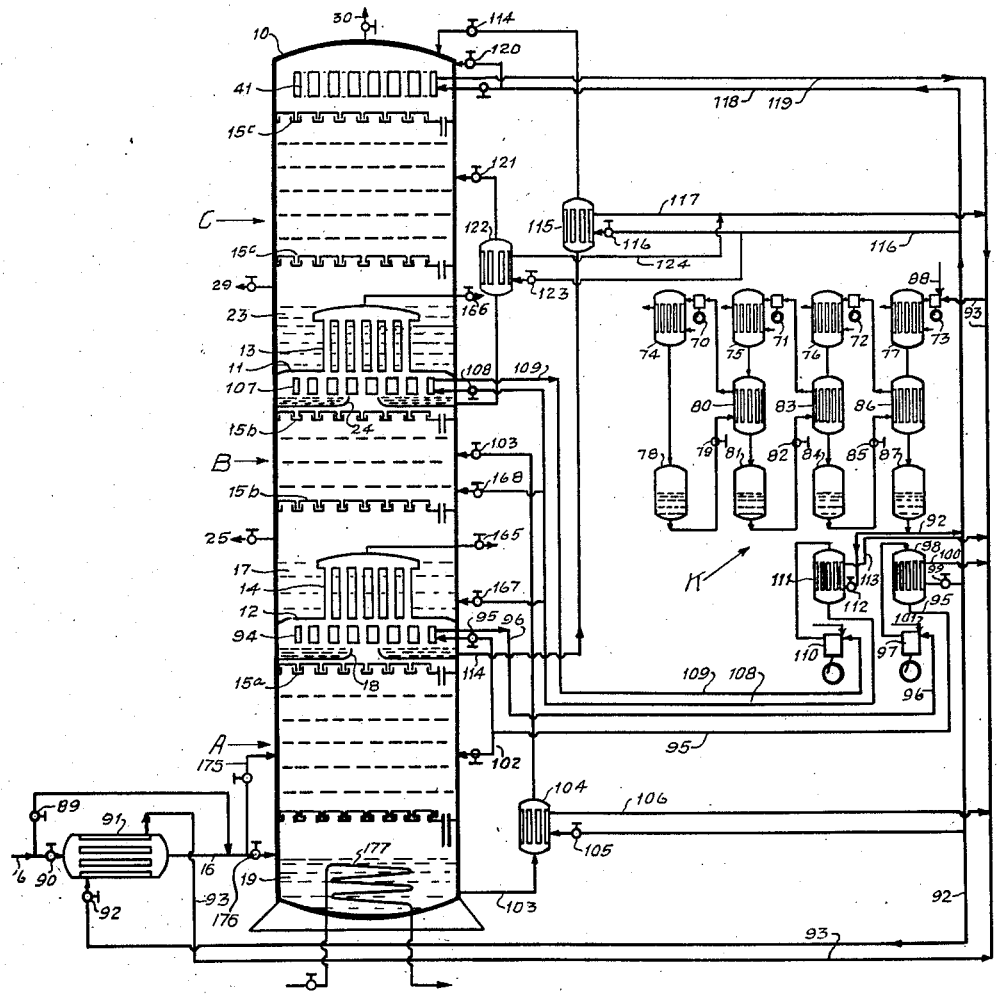
Fig. 2 is a similar diagram of an apparatus illustrating methods of applying controlled refrigerative effects from extraneous sources.

A modification of the above structure and method is illustrated in Fig. 2, which shows a number of useful ways in which refrigeration may be applied to various points in the column from outside sources. These additional refrigeration steps may be utilized to supply deficiencies at any point in the system.

In the drawings the column shell 10, the partitions 11 and 12, the condensers 13 and 14 and the fractionating plates 15a, 15b and 15c may be identical with the correspondingly numbered elements of Fig. 1.

The modification of Fig. 2 is provided with an external gas liquefaction system indicated generally at K. This system comprises four compressors 70, 71, 72 and 73 compressing anhydrous ammonia, ethylene, methane and nitrogen respectively. The compressed gases pass in parallel through water coolers 74, 75, 76 and 77 in which they are brought back to atmospheric temperature. At this temperature and under sufficient pressure the ammonia liquefies and collects in receiver 78. The liquid ammonia passes through pipe and expansion valve 79 into the shell of an interchanger 80 in which it evaporates in liquefying the stream of compressed and water cooled ethylene, which collects in receiver 81, the expanded ammonia returning to compressor 70.

The liquefied ethylene passes through a pipe and expansion valve 82 into the shell of an interchanger 83 in which it evaporates in liquefying the stream of compressed and cooled methane, which collects in receiver 84, the expanded ethylene returning to compressor 71.

The liquefied methane passes through a pipe and expansion valve 85 into the shell of an interchanger 86 in which it evaporates in liquefying the stream of compressed and cooled nitrogen, which collects in receiver 87, the expanded methane returning to compressor 72. The nitrogen collecting in receiver 87 is stored for use in various parts of the system, as will be described, a portion of it being discharged with the gaseous products of fractionation and a corresponding quantity of gaseous make-up nitrogen being supplied to compressor 73 through pipe 88 from any convenient source.

Air previously compressed to say 8 atmospheres absolute, dehydrated and deprived of its carbon dioxide, is introduced to the bottom of the column through pipe 16. This air may previously have been reduced to the condition of a saturated vapor by heat interchange against outgoing products of fractionation, in which case it passes through stop valve and by-pass pipe 89 directly to the column, or it may have been insufficiently cooled. In the latter case it passes through stop valve 90 into a heat interchanger 91 in which it is further cooled by the evaporation of liquid nitrogen drawn from receiver 87 through pipe and expansion valve 92, the expanded nitrogen returning to compressor 73 through pipe 93.

Under some conditions it may be desirable to introduce a liquid feed, means for the liquefaction of same being shown in interchanger 91. A liquid feed would be introduced at a higher level than a gaseous feed. For this purpose a valve controlled pipe 175 is shown, a valve 176 being provided in pipe 16 to divert the feed to this level. A liquid feed would require the addition of a boiling coil 177, the heating fluid for which might be drawn from any convenient source not shown.

The gaseous air entering compartment A is liquefied therein in transferring heat through condenser 14 to a bath 17 of pure oxygen boiling at a pressure of say 2.7 atm. absolute in the bottom of compartment B. The pure gaseous oxygen so produced is withdrawn from the column as a final product through pipe and control valve 25.

The liquid produced by condenser 14 drains into a trough 18 from which a portion overflows to reflux the plates 15a below. Additional reflux liquid may be provided by the use of reflux condenser 94 which is supplied with liquid air through pipe and expansion valve 95. The expanded air returns through pipe 96 to an air compressor 97 (with aftercooler) which delivers into an interchanger 98 in which the air is liquefied by the evaporation of liquid nitrogen drawn from pipe 92 through pipe and expansion valve 99, the expanded nitrogen returning to pipe 93 through branch pipe 100.

Compressor 97 may be provided with an inlet 101 for air and liquid air may then be introduced into a medial level in compartment A through expansion valve and pipe 102 branched from pipe 95. Air so introduced is added to the quantity fractionated and does not return to the air compressor, but a desired refrigerative effect may be produced in compartment A by a controlled admission of liquid air at this point.

The fractionating effect of plates 15a causes pure liquid nitrogen to collect in trough 18, while a mixture of nitrogen, argon and oxygen (the so-called crude oxygen) collects in the pool 19 in the bottom of the column.

The crude oxygen passes through pipe and control valve 103 into compartment B at a medial level. This compartment being at a lower pressure than compartment A, there will be flashing and spattering of the feed at the point of admission unless it be subcooled. It is therefore desirable to interpose in pipe 103 an interchanger 104 in which the feed is cooled to such point as to prevent ebullition by the evaporation of liquid nitrogen drawn from pipe 92 through pipe and expansion valve 105 and returned to pipe 93 through branch pipe 106.

The crude oxygen feed is fractionated on plates 15b, pure liquid oxygen collecting in pool 17. The vapors passing upwardly are liquefied in transferring heat through condenser 13 to a bath 23 of pure liquid argon boiling at slightly above atmospheric pressure in the bottom of compartment C. The pure gaseous argon so produced is withdrawn as a final product through pipe and control valve 29.

The liquid so condensed, a mixture of nitrogen and argon, drains into a trough 24 from which a portion of the liquid overflows to reflux plates 15b below. Additional reflux liquid for these plates may be produced by the use of reflux condenser 107 which is supplied with liquid oxygen (pure or impure as may be convenient) through pipe and expansion valve 108. The expanded oxygen returns through pipe 109 to a compressor 110 (with aftercooler) which delivers into an interchanger 111 in which the oxygen is liquefied by the evaporation of liquid nitrogen drawn from pipe 92 through pipe and expansion valve 112 and returned to pipe 93 through branch pipe 113.

If desired, pure oxygen in liquid form may be introduced into the lower part of compartment B through expansion valve and pipe 167, branched from oxygen supply pipe 168. This oxygen adds itself to the product oxygen withdrawn from the system at 25. If the oxygen compressor is handling an impure oxygen it may be introduced at a suitable height in this compartment as through pipe and valve 168.

A portion of the pure nitrogen collecting in trough 18 is withdrawn through pipe and control valve 114 into the upper part of compartment C, where it functions as reflux liquid for the plates 15c in this compartment. Because of the pressure drop from compartment C to compartment A, it is desirable to subcool this transferred stream, and to this end it may be passed through an interchanger 115 in which it is cooled by the evaporation of liquid nitrogen drawn from pipe 92 through pipe and expansion valve 116, the expanded nitrogen being returned to pipe 93 through branch pipe 117.

Additional reflux liquid for compartment C may be produced by the use of reflux condenser 41 which is supplied with liquid nitrogen drawn from pipe 92 through pipe and expansion valve 118, the expanded nitrogen being returned to pipe 93 through branch pipe 119. If preferred, liquid nitrogen for reflux may also be admitted direct to the column through control valve and pipe 120 branched from pipe 118.

A portion of the mixture of nitrogen and argon collecting in trough 24 is continuously withdrawn through pipe and control valve 121 and introduced into a medial portion of compartment C. It is desirable to subcool this transferred stream, for the reasons above given, and to this end it may be passed through an interchanger 122 which is supplied with liquid nitrogen drawn from pipe 92 through pipe 116 and pipe and expansion valve 123, the expanded nitrogen being returned to pipe 93 through pipes 124 and 117.

This feed of nitrogen and argon is fractionated on plates 15c, pure liquid argon collecting in pool 23. The vapors reaching the top of the compartment consist of pure nitrogen, which is withdrawn as a final product in gaseous form through outlet pipe 32.

The purpose of the above description of Fig. 2 is not to fully set forth a practicable working process, it being evident that the combination of steps described would yield several cold expanded gases, the refrigerative value of which would be lost unless warm gases could be found against which they could usefully be heat interchanged. The description shows, however, how any of the individual steps described might be used to modify the functioning of corresponding stages in any complete fractionating process (such, for example, as that described in connection with Fig. 1) by the supplementing or replacing of refrigerative effects produced within the fractionating system by refrigeration introduced from an entirely extraneous source. By this use of external refrigeration a flexibility and a completeness of control may be attained which is not possible in a fractionating system which depends wholly on internal or cyclic refrigeration.

Figure 3:
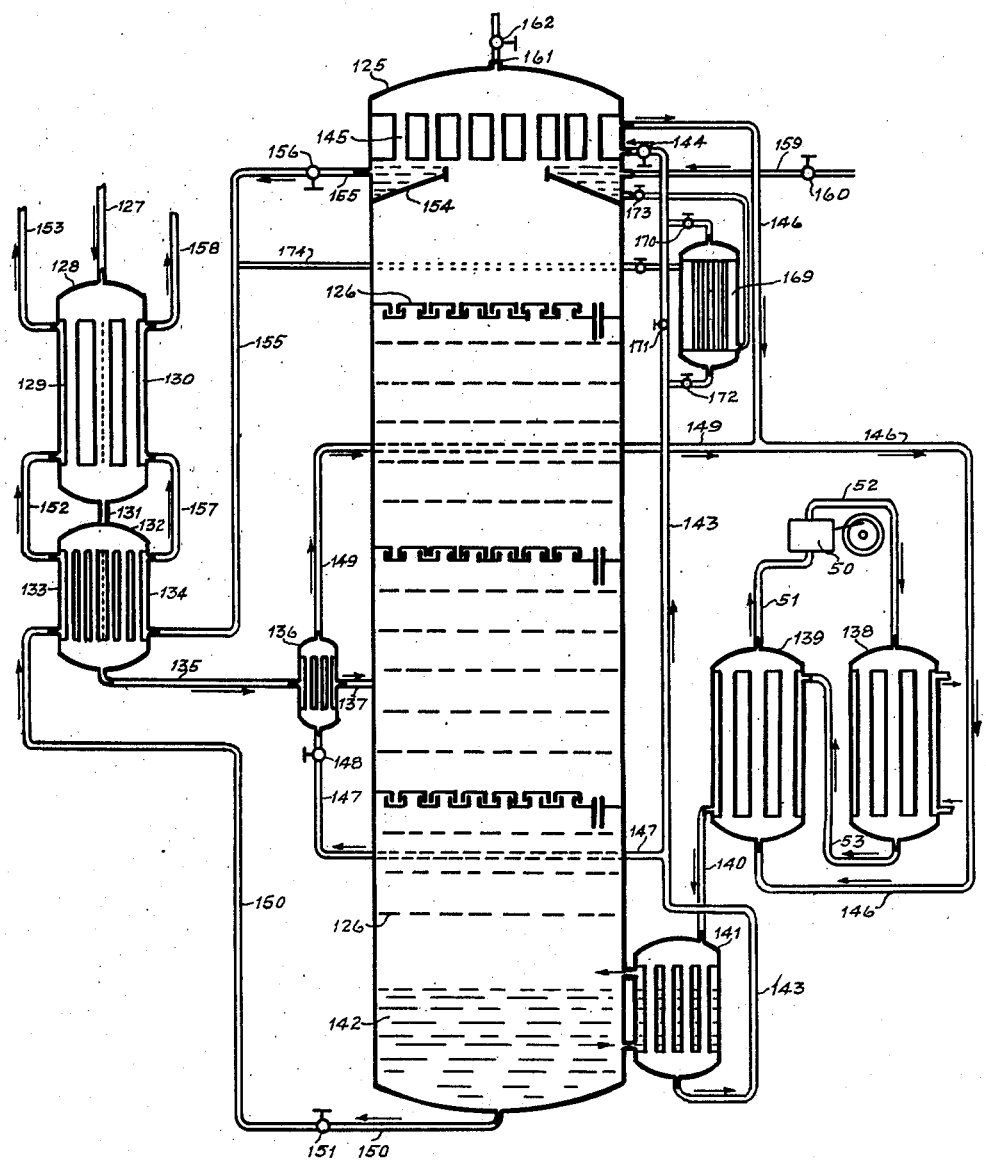
Fig. 3 is a similar diagram illustrating the application of a transfer cycle to a single stage fractionating column.

In Fig. 3 is shown a modification of the invention in which the principles of the transfer cycle are applied to a single stage fractionation. In this illustration air is supplied to the column as a liquid and the products, nitrogen free from oxygen and oxygen free from nitrogen, are withdrawn from the column in the same condition.

Referring to the drawings, 125 is a column containing bubble or other fractionating plates 126. Air under a pressure slightly above atmospheric is supplied through pipe 127 to the tubes of a heat interchanger 128. The shell of this unit is divided into two parallel sections 129 and 130 through which product oxygen and product nitrogen are passed in gaseous form to effect the first cooling of the air stream. The air thus cooled passes through pipe 131 to the tubes of a second interchanger 132, the shell of which is also divided into parallel sections 133 and 134. In this interchanger the air is partially or entirely liquefied by the evaporation of liquid nitrogen and oxygen produced in and drawn from the column. The air then passes through pipe 135 into a third interchanger 136 in which, if not already completely liquefied, it is brought to the liquid condition by the evaporation of liquid nitrogen supplied by a transfer cycle next to be described, and enters the column through pipe 137 at a suitable medial point in the height.

The plates in the column function in the well known manner to separate the more volatile from the less volatile constituents of the feed, but only when the temperature at the bottom of the column is materially above the temperature at the top. To maintain this temperature head and upward flow of heat through the column a transfer circuit filled with nitrogen is provided.

Starting with a compressor 50 supplied with gaseous nitrogen, the nitrogen compressed to say four atmospheres absolute passes through pipe 52 to a cooler 138, the shell of which is supplied with water at atmospheric temperature. The water cooled gas then passes through pipe 53 to an interchanger 139 which cools and may partially liquefy it by exchange against returning cold gases as will be described. Passing thence through pipe 140 to an interchanger 141 constantly flooded by a pool 142 of oxygen (plus argon) in the bottom of the column, it continuously boils the contents of this pool and by heat interchange is itself completely liquefied. The liquid nitrogen passes then through pipe 143 to an expansion valve 144 by which it is released to atmospheric pressure and is admitted in desired quantity to a condenser 145 in the top of the column. This condenser produces any quantity of liquid nitrogen required as reflux to produce sharp fractionation on the plates below. The expanded nitrogen returns through pipe 146 to the tubes of interchanger 139 to cool the compressed, atmospheric temperature gas, and passes thence through pipe 51 to the suction side of compressor 50, thus completing the transfer cycle.

From pipe 143, conveying liquid nitrogen, a branch pipe 147 is taken to an expansion valve 148 which admits to interchanger 136 such quantity of liquid nitrogen as may be required to complete the liquefaction of the air supply. The expanded nitrogen returns to interchanger 139 by way of pipes 149 and 146 and thence to compressor 50.

The liquid oxygen collecting in pool 142 in the bottom of the column passes through pipe 150 and control valve 151 to passage 133 of interchanger 132, in which it is evaporated in producing partial liquefaction of the air supply as described. The cold oxygen gas from this evaporation flows through pipe 152 to passage 129 of interchanger 128, in which it is warmed in effecting part of the first cooling of the air supply and is finally discharged at atmospheric temperature and pressure through pipe 153.

The nitrogen produced by fractionating of the air supply collects in an annular trough 154 placed beneath condenser 145 and is taken thence through a similar succession of heat interchange steps by pipe 155, control valve 156, passage 134, pipe 157 and passage 130, and is finally discharged at atmospheric temperature and pressure through pipe 158. The excess of condensate over nitrogen production overflows the trough onto the plates below, where it acts as reflux liquid.

A further supply of liquid nitrogen for refrigerative purposes may be introduced from any outside source, such as the unit K of Fig. 2, through pipe 159 and control valve 160, the quantity so introduced being ultimately removed through pipe 155 in admixture with the product nitrogen. The flash from this added nitrogen is condensed by condenser 145 and the heat so abstracted is transferred through the transfer circuit to the bottom of the column.

A pipe 161 and valve 162 are useful in ridding the system of incondensible gases, which would otherwise accumulate in the upper end of the column and blanket the condenser. Similar valve controlled vents are shown in Fig. 2, at 165 on condenser 17 and at 166 on condenser 23 and have the same purpose. Such vents should also be applied to the same condensers in the apparatus of Fig. 1, though not shown on that figure.

The forms of apparatus above described may be used for many purposes other than the fractionation of air. As illustrations of such uses we may take the fractionation of mixtures of hydrocarbon gases, such as the mixture of methane and ethane occurring in many natural gases and the mixture of methane and ethylene which is the major occurrence in the incondensible gases from petroleum cracking stills.

In fractionating a hydrocarbon mixture in apparatus involving a transfer circuit, the choice of a transfer fluid would be governed by the pressure at which it is preferred to operate the column. Taking the fractionation of methane from ethylene as an example, methane may be used as a transfer fluid at column pressures ranging from 1 to 3 atmospheres absolute, ethylene at column pressures from 21 to 50 atmospheres, and ethane at any column pressure above 38 atmospheres.

In fractionating this mixture at 1 atm. absolute the pool of ethylene 142 in the bottom of the column boils at 168° K. and to condense methane in the transfer circuit at this temperature (in interchanger 141) the methane would have to be compressed to slightly over 21 atm. The expansion of the transfer circuit methane to 1 atm. in condenser 145 reduces its temperature to 112° K., the boiling point of methane at 1 atm. In order to transfer heat from the condensing to the evaporating fluid it is necessary to provide a heat head through the wall of the condenser. Ordinarily a temperature difference of 5° C. is sufficient for a reasonable rate of heat transfer, which would require a pressure difference between the two sides of the condenser of about 0.5 atm. This pressure difference may be had by raising the column pressure to about 1.5 atm. or by lowering the expansion pressure in the transfer circuit to about 0.5 atm. The first alternative is the more economical, particularly in view of the fact that there will hardly be less than one-half atmosphere pressure drop through the interchangers 132 and 128.

At the upper end of the range a pressure of 3 atm. on the column would raise the boiling point of the ethylene in pool 142 to 192° K., the critical temperature of methane, above which the methane in the transfer circuit would not condense in interchanger 141. At higher column pressures it is therefore necessary to go to a transfer fluid having a higher critical temperature.

Using ethylene in the transfer circuit the practicable pressure range in the column (assuming that it is not desirable to expand the transfer fluid below 1 atm.) is from 21 to 50 atm. Ethylene boiling at 1 atm. in condenser 145 gives a temperature of 168° K. in the top of the column, at which methane condenses at 21 atm. (without allowance for heat head). At the other end of the range, the critical temperature of ethylene, above which it cannot be condensed in interchanger 141, is 282° K. which is the boiling point of the ethylene in the column at 50 atm. or above (i. e., the critical temperature of ethylene). The pressure required in the transfer circuit is the same as that in the column, plus an allowance for heat head.

Using ethane in the transfer circuit, the practicable pressure range in the column is from 38 atmospheres upward. Ethane evaporating at 1 atm. produces a temperature of 185° K. at which methane condenses at 38 atm. The ethylene in the bottom of the column evaporates at 282° K., its critical temperature, regardless of pressure, and there is therefore no top limit to column pressure as the critical temperature of ethane is above that of ethylene. To condense ethane at 282° K. requires a transfer circuit pressure of 30 atmospheres, and there would be no increase in transfer circuit pressure with increasing column pressure.

For fractionating a mixture of methane and ethane the use of methane in the transfer circuit is undesirable because of the wide spread between the boiling points of methane and ethane. The upper absolute pressure limit on the column would be 1.4 atm. and unless the transfer fluid were evaporated to subatmospheric pressure, there would be barely sufficient heat head on the lower condenser to condense the transfer fluid, even with largely extended transfer surface.

Using ethylene as a transfer fluid the lowest practical column pressure is 21 atm., the pressure at which methane condenses at the atmospheric pressure boiling point of ethylene. The absolute upper limit is 29 atm., the highest pressure at which ethane can be boiled below the critical temperature of the ethylene in the transfer circuit. The transfer circuit pressures would be 38 atm. at the lower column pressure limit and 50 atm. at the higher.

Using ethane as a transfer fluid the lower practical column pressure limit is 38 atm., the pressure at which methane condenses at the atmospheric pressure boiling point of ethane. The upper limit would of course be the critical pressure of ethane, 48 atm., or properly somewhat below this point to provide temperature difference to condense the transfer ethane. The pressures in the transfer circuit would in any case be slightly above the column pressure.

Whatever the nature of the gaseous mixture being fractionated, the Joule-Thompson effect available in the products of the fractionation increases as the column pressure increases, and at some point which cannot be fixed for other than a specific case this effect becomes practically useful for supplying refrigeration to the top of the column.

At relatively low superatmospheric column pressures this effect may be utilized in the main interchangers, in compensating heat infiltration into these units, but at the point at which the temperature of the liquid feed has been reduced to the temperature of the column plate on which the composition of the liquid on the plate requires the feed to be introduced, the limit of refrigeration of the feed is reached. Subcooling of the feed below the temperature of the introduction plate results only in rendering nonfunctional this plate and those immediately below it.

Any Joule-Thompson effect available in the outgoing products over and above such as may usefully be applied to the feed stream may be used to advantage in refrigerating the top of the column, by heat interchange with the liquefied transfer fluid prior to its expansion into condenser 145. For this purpose an interchanger such as indicated at 169 is connected in shunt into the course of pipe 143, valves 170, 171 and 172 being arranged to divert and control the flow through this interchanger. The low boiling liquid condensing in the upper end of the tower may be withdrawn in desired quantity through valved pipe 173 and evaporated in interchanger 169, the vapors being conducted through pipe 174 to a junction with the main discharge of light product passing through pipe 155 to the main interchangers. By this means the transfer fluid may be cooled from the temperature at which it condenses in interchanger 141, this being the temperature at the bottom of the tower, to the temperature at which the top fraction flashes at approximately atmospheric pressure, and this quantity of refrigeration (the product of temperature reduction $x$ specific heat $x$ weight of transfer fluid) may be introduced into the top of the tower to compensate heat infiltration into the portion of the tower which is below the temperature of the feed stream.

I claim as my invention:

1. Apparatus for fractionating a mixture of fluids, comprising: a first, a second and a third fractionating compartment; means for maintaining a descending order of pressures in said first, second and third compartments; means for introducing the fluid to be fractionated into said first compartment; means for heating the lower portions of at least the second and third of said compartments; means for cooling the upper portions of at least the first and second of said compartments; means for transferring liquid from the lower portion of said first compartment into a medial portion of said second compartment; means for collecting liquid in the upper portion of said second compartment and for transferring said collected liquid into a medial portion of said third compartment, and means for transferring a fluid from the upper portion of said first compartment into said third compartment at a level above that of last said point of liquid introduction.

2. Apparatus substantially as and for the purpose set forth in claim 1, in which the heating means for said second compartment is also the cooling means for said first compartment and the heating means for said third compartment is also the cooling means for said second compartment.

3. Apparatus substantially as and for the purpose set forth in claim 1, in which said first, second and third compartments are arranged in ascending order and in which each said heating means is in the form of a condenser cooled by liquid evaporating in the compartment next above, said condenser draining into the compartment next below.

4. Apparatus substantially as and for the purpose set forth in claim 1, including means for cooling a stream of the liquid transferred from the lower portion of said first compartment to the medial portion of said second compartment.

5. Apparatus substantially as and for the purpose set forth in claim 1, including means for cooling a stream of the fluid transferred from the upper portion of said first compartment to said third compartment.

6. Apparatus substantially as and for the purpose set forth in claim 1, including means for cooling a stream of the liquid transferred from the upper portion of said second compartment to the medial portion of said third compartment.

7. Apparatus substantially as and for the purpose set forth in claim 1, including means for vaporizing liquid collecting in the lower portion of said third compartment by heat interchange against a stream of compressed gas.

8. Apparatus substantially as and for the purpose set forth in claim 1, including a condenser arranged to supply condensate to the plates in said third compartment, and means for supplying a cooling fluid to said condenser.

9. Apparatus substantially as and for the purpose set forth in claim 1, including a transfer circuit comprising a heat interchanger interposed in at least one of said transferring means; means for delivering a liquefied gaseous refrigerant to said interchanger and for removing evaporated refrigerant therefrom; means for compressing said evaporated refrigerant, and means for bringing said compressed refrigerant into heat interchange relation with liquid collecting in the lower portion of at least one of said compartments.

10. Apparatus substantially as and for the purpose set forth in claim 1, including a condenser arranged in the upper portion of said third compartment; means for delivering a liquefied gaseous refrigerant to said condenser and for removing evaporated refrigerant therefrom; means for compressing said gaseous refrigerant, and means for bringing said compressed refrigerant into heat interchange relation with liquid collecting in the lower portion of at least one of said compartments.

11. In combination with a fractionating column, a transfer circuit comprising a heat interchanger interposed in the path of a feed to said column; means for delivering a liquefied gaseous refrigerant to said interchanger and for removing evaporated refrigerant therefrom; means for compressing said evaporated refrigerant, and means for bringing said compressed refrigerant into heat interchange relation with liquid collecting in a portion of said column lower than the point of introduction of said feed.

12. In the operation of a gas fractionating column, the steps of evaporating mist in a wet saturated gaseous fractionation product and of utilizing the refrigerative effect so produced in refrigerating a portion of the column above the point of introduction of the mixture to be fractionated.

13. In the operation of an air fractionating column, the steps comprising: supplying to said column a first stream of cooled gaseous air and producing fractionation of said stream therein; completing the liquefaction of a second stream of air by refrigeration additional to and independent of the refrigerative effect available in the products of said fractionation, and utilizing the latent heat of evaporation of said liquefied stream in imparting a refrigerative effect to said column.

14. In the operation of an air fractionating column, the steps comprising: supplying to said column a cooled stream of gaseous air and producing fractionation of said stream therein; liquefying a gaseous stream consisting substantially of oxygen by refrigeration additional to and independent of the refrigerative effect available in the products of said fractionation, and utilizing the latent heat of evaporation of said liquefied stream in imparting a refrigerative effect to said column.

15. In the operation of an air fractionating column, the steps comprising: supplying to said column a first stream of cooled gaseous air and producing fractionation of said stream therein; completing the liquefaction of a second stream of air by refrigeration additional to and independent of the refrigerative effect available in the products of said fractionation, and introducing said liquefied stream into said column to impart a refrigerative effect thereto.

16. In the operation of a fractionating column, the steps comprising: supplying to said column a cooled stream of gaseous air and producing fractionation of said stream therein; liquefying a gaseous stream consisting substantially of oxygen by refrigeration additional to and independent of the refrigerative effect available in the products of said fractionation, and introducing said liquefied stream into said column to impart a refrigerative effect thereto.

17. In the operation of a fractionating column, the steps comprising: maintaining a plurality of pressures in separated zones within said column; transferring a fraction produced in a zone of higher pressure to a zone of lower pressure; liquefying a stream of a gaseous refrigerant solely by refrigeration additional to and independent of the refrigerative effect available in the fractionated products of said column, and evaporating said liquefied stream in indirect heat interchange relation with said transferred fraction during said transferring step, whereby a refrigerative effect is imparted to said fraction and indirectly to fluids within said zone of lower pressure.

18. In the operation of a fractionating system having separated fractionating zones, the steps comprising: transferring a fraction produced in one of said zones into another of said zones; liquefying a stream of a gaseous refrigerant solely by refrigeration additional to and independent of the refrigerative effect available in the fractionated products of said system, and evaporating said liquefied stream in indirect heat interchange relationship with said transferred fraction during said transferring step, whereby a refrigerative effect is imparted to said fraction and indirectly to fluids within the zone to which said fraction is introduced.

19. In the operation of a gas fractionating column, the steps comprising: liquefying a stream of a gaseous refrigerant solely by refrigeration additional to and independent of the refrigerative effect available in the products of said fractionation; evaporating said liquefied stream in heat interchange relation with a second gaseous stream and thereby liquefying said second stream, and introducing said second stream in liquid condition into said column.

20. In the fractionation of mixed gases: the utilization of the temperature drop on expansion of a product permanently withdrawn from a fractionating column to effect a transfer of refrigeration from said product to said column at a point in said column colder than the point of entry of the mixture to be fractionated.

21. The process of separating a gaseous mixture which comprises: fractionating said mixture in a fractionating zone; evaporating mist entrained in a product of said fractionation by heat additional to and independent of heat resident in said mixture, and returning the refrigerative effect of said evaporation to aid in cooling said fractionating zone.

LEE S. TWOMEY.